United States Patent [19]

Hubbard et al.

[11] Patent Number: 4,566,910

[45] Date of Patent: Jan. 28, 1986

[54] STARCH PHOSPHATES AND AMPHOTERIC STARCH PHOSPHATES

[75] Inventors: E. Daniel Hubbard, West Liberty; Richard D. Harvey; Mark L. Hogen, both of Muscatine, all of Iowa

[73] Assignee: Grain Processing Corporation, Muscatine, Iowa

[21] Appl. No.: 441,388

[22] Filed: Nov. 12, 1982

[51] Int. Cl.$^4$ .............................................. C08B 31/00
[52] U.S. Cl. ...................................... 127/70; 127/33; 127/71; 162/175; 536/109
[58] Field of Search ............... 162/175; 536/109, 102; 127/32, 33, 65, 67, 69, 70, 71

[56] References Cited

U.S. PATENT DOCUMENTS

| | | | |
|---|---|---|---|
| 3,320,237 | 5/1967 | Greidinger | 536/109 |
| 3,459,632 | 8/1969 | Caldwell et al. | 162/175 |
| 3,467,647 | 9/1969 | Benninga | 162/175 |
| 3,598,623 | 8/1971 | Powers et al. | 106/214 |
| 3,719,662 | 3/1973 | Tessler | 162/175 |
| 3,842,071 | 10/1974 | Tessler | 260/233.5 |
| 3,901,878 | 8/1975 | Hunt et al. | 210/731 |
| 4,097,427 | 6/1978 | Aitken et al. | 162/175 |
| 4,243,479 | 1/1981 | Tessler | 162/175 |
| 4,373,099 | 2/1983 | Hubbard et al. | 536/102 |
| 4,379,919 | 4/1983 | Tessler et al. | 536/109 |
| 4,393,202 | 7/1983 | Breuninger | 127/68 |

FOREIGN PATENT DOCUMENTS 855731 12/1960 United Kingdom ............... 536/109

*Primary Examiner*—Benoit Castel
*Assistant Examiner*—W. Gary Jones
*Attorney, Agent, or Firm*—Neuman, Williams, Anderson & Olson

[57] ABSTRACT

Starch phosphates are prepared by reacting with an alkaline starch paste while maintaining an alkaline pH a phosphate salt at a temperature of about 45° to 95° C. for a period of not more than about 120 minutes. Amphoteric starch phosphates are prepared by also reacting with the starch paste a cationizing agent.

32 Claims, No Drawings

STARCH PHOSPHATES AND AMPHOTERIC STARCH PHOSPHATES

This invention relates to the preparation of starch phosphates and to amphoteric starch phosphates.

Starch phosphates and amphoteric starch phosphates are useful in various applications, including use as wet-end and size-press papermaking additives, ceiling tile additives, drilling fluid additives, viscosity modifiers and agents in ore recovery operations.

Generally, past procedures for the production of starch phosphates have involved granular, usually dry state reactions as described, for example, in U.S. Pat. Nos. 4,029,544, 4,166,173 and 4,216,310.

These basic procedures, though widely used, entail certain problems. Thus, granule state reactions in aqueous slurries require the addition of gelatinization inhibitors to prevent granule swelling. Because of the need to maintain the starch in granular form, reaction temperatures must be low (less than about 50° C.) to guard against gelatinization. Low reaction temperatures result in long reaction times, such as 12 hours or more. The resultant highly alkaline reaction slurries must be neutralized and the added gelatinization inhibiting salts removed by washing before drying. The washing operations, however, result in significant losses of starch (especially the more highly derivatized portion), contributing not only to reduced product yields but also to increased biological oxygen demand (BOD) and suspended solids loads in the waste water streams. The preparation of low viscosity, granular, starch derivatives by superimposing a viscosity reducing operation—such as acid-modification, oxidation, etc.—either prior to or after derivatization, accentuates the solubles loss problem still further resulting in even greater BOD loadings.

In addition, the variety of derivatized starches commercially available suggests the products are intended for specific use areas and problems. Specialized starches of this type tend to be relatively low volume products and hence must command premium prices which further restrict their usage. This specialization creates inventory problems for the user due to the warehousing of a variety of different starches to meet various requirements.

The production of anionic starch phosphates or amphoteric cationic starch phosphates by the present invention overcomes many of the disadvantages inherent in prior art, granular state reactions. Namely, by the present invention (1) reaction efficiencies are improved, (2) the use of starch gelatinization inhibitors and washing steps are eliminated, (3) multiple derivatization reactions can be conducted simultaneously, (4) waste treatment is reduced or eliminated when the derivatives are produced on the use site, (5) on-site derivatization reduces the cost of the product by reducing starch losses and drying costs, and (6) a variety of products with different anionic:cationic ratios can be produced as needed, eliminating the need to warehouse a number of products that may be used infrequently and in small amounts.

One object of the invention is to produce phosphate derivatives of starch by processes which provide higher reaction efficiencies and degree of substitution than has been possible heretofore.

Another object of the invention is to provide methods for producing starch phosphate derivatives which can be carried out at the use site of the products.

A further object of the invention is to produce starch phosphates in short periods of time.

Still another object of the invention is to produce amphoteric starch phosphate derivatives.

In accordance with this invention, anionic starch phosphate derivatives are prepared in relatively short periods by treating a thinned starch, which has been gelatinized, with an inorganic phosphate reagent. In accordance with a further embodiment of the invention, amphoteric starch derivatives having anionic and cationic moieties are prepared by treating a gelatinized starch with a phosphate salt and either simultaneously or sequentially treating said starch with a cationizing agent.

To achieve the advantages of this invention it is necessary that the starch which is reacted with an inorganic phosphate salt or organic phosphate be in a dispersed or pasted state. Dispersed or pasted are terms commonly used in the art to refer to an aqueous starch suspension which has been hydrated or gelatinized by any of a number of means known to those skilled in the art. For example, pasting of the starch can be achieved by live steam injection into a starch slurry, external heat application to a starch slurry, autoclaving a starch slurry, or by jet cooking and the like.

Generally, phosphorylation of starch increases the viscosity of the starch due presumably to a crosslinking effect by formation of distarch phosphates. This is particularly so with starch pastes that have not been appreciably hydrolyzed during the pasting process. Starch pastes that have been only slightly hydrolyzed exhibit a greater increase in viscosity by phosphorylation than do pastes that have been more extensively hydrolyzed.

Accordingly, in the practice of the present invention a thinned starch paste is reacted with an inorganic phosphate salt or organic phosphate. Thinning of the starch paste before reacting therewith the inorganic phosphate salt can be accomplished, as is known, by treating a starch with an oxidizing agent such as ammonium persulfate (AP) or such water soluble oxidants as sodium or potassium persulfates, peroxides, permanganates, performates, alkaline hypochlorites such as sodium hypochlorite and the like. Various procedures for hydrolyzing or thinning starch are known in the art and can be followed to achieve a thinned starch paste which is the principal reactant in the process herein described. A particularly preferred procedure for preparing a thinned starch paste is by thermal-chemical conversion of a starch slurry using ammonium persulfate as described, for example, in U.S. Pat. No. 3,211,564.

To prepare an anionic starch phosphate in accordance with one embodiment of this invention, an aqueous slurry of a thinned and pasted starch is treated with an inorganic phosphate salt or an organic phosphate such as sodium trimetaphosphate, sodium hexametaphosphate, sodium pyrophosphate, dimethyl acid pyrophosphate, dioctyl acid pyrophosphate, and the like and mixtures thereof. The starch concentration of the aqueous slurry can vary depending to great extent on the ultimate use to be made of the product. For example, if the starch phosphate is prepared on the use site, the concentration of the starch in the slurry can generally be lower than if the product is to be recovered and dried for shipping to the use site. Generally, the concentration of the starch in the slurry is in the range of from about 3 to 40% by weight, dry solids (d.s.) and more preferably in the range of from about 10 to 40% by weight, dry solids.

The phosphorylation reaction is conducted at a temperature of from about 45° C. to 95° C. for a period up to about 120 minutes. Generally, reaction periods ranging from 5 to 80 minutes are sufficient and thus preferred. The amount of the phosphorylating agent employed depends on the reagents selected and the intended use of the product. Generally the phosphorylating reagent is employed in an amount ranging from 0.001 to 20% by weight of starch, dry solids, and preferably from 0.01 to 2% by weight.

The efficiency of the phosphorylation reaction is improved by the presence of an alkali or alkaline material during the reaction. Thus, it is preferred to incorporate in the reaction mixture an alkali or alkaline material such as sodium hydroxide, potassium hydroxide, calcium hydroxide, calcium oxide, sodium carbonate, morpholine and the like. The alkali or alkaline material is used in an amount preferably ranging from about 1 to 8% by weight of starch, dry solids.

Any of the commonly used starches can be derivatized in accordance with this invention. Examples of suitable starches include corn, wheat, rice, tapioca, potato and sago starches as well as starches which have been premodified such as, for example, acid modified starches and the like.

In accordance with a further embodiment of the invention, amphoteric starch derivatives can be prepared by reacting a cationizing reagent with starch. The cationizing reagent can be reacted with the starch simultaneously with the phosphorylation reaction or the cationizing reaction can be carried out sequentially with the cationizing reaction being conducted prior to or subsequent to the phosphorylation reaction. Various cationic reagents known in the art can be used to form the amphoteric starch derivatives. Examples of such cationic reagents are cationic monomeric halogenated alkyl or alkenyl amines such as 2-diethylaminoethyl chloride hydrochloride (DEAE), 4-chloro-2-butenyltrimethylammonium chloride (CBTC), 3-chloro-2-hydroxypropyltrimethylammonium chloride (CHPTA), 2,3-epoxypropyltrimethylammonium chloride, polyquaternaryamine chloride as described in U.S. Pat. Nos. 3,854,970 and 3,930,877, and the like. The amount of cationic reagent to employ depends on the anionic:cationic ratio desired in the final amphoteric product. Preferred amphoteric starch derivatives are those having an anionic:cationic molar ratio of from 5 to 50% by weight of starch, dry solids.

By a thinned starch as used herein is meant a starch that has been hydrolyzed by any of several methods known to those skilled in the art, resulting in a "thinned" starch of higher fluidity.

The invention and the advantages thereof will be further apparent from the following specific examples.

EXAMPLE 1

This example demonstrates the requirements for starch phosphorylation using typical prior art conditions with resultant relatively poor reaction efficiencies.

An aqueous, 40% dry solids (ds) slurry of a 65 Buel fluidity, acid-modified corn starch was prepared and treated with a solution consisting of 1.5% sodium hydroxide on starch dry solids (as a 30% wt/wt solution) and 4% sodium chloride on the water in the slurry (as a 26% wt/wt solution). The slurry was then placed in a 110° F. water bath and allowed to come to temperature before adding 0.5% sodium trimetaphosphate (as is, on starch ds). Periodically, samples were removed and immediately adjusted to pH 5.5–6.0 using 5N hydrochloric acid. The neutralized slurry was filtered on a Buchner funnel, washed with one-half volume warm tap water and the wet cake dried overnight at 50° C. in a forced air oven. Portions of the resultant dry product were assayed for phosphorus using atomic absorption procedures.

| Reaction Time (Hours) | Phosphorus in Dry Product (% dsb)* | Reaction Efficiency (%) |
| --- | --- | --- |
| 0 | 0.017 | — |
| 2 | 0.023 | 5 |
| 4 | 0.033 | 14 |
| 7.33 | 0.035 | 27 |
| 22.75 | 0.045 | 35 |

*dsb - dry solids basis

The results summarized above show sodium trimetaphosphate did react with the granular starch at a slow reaction rate. After about 23 hours the efficiency of the granular starch-sodium trimetaphosphate reaction was only 35%.

EXAMPLE 2

Starch pastes were prepared by thermally-chemically converting an aqueous 25% dry solids slurry of unmodified corn starch using various ammonium persulfate (AP) levels and the following conditions:

Conversion temperature: About 155° C.
Retention time: About 5 minutes

Portions of the resultant paste were weighed into beakers equipped with agitators and then placed in a water bath at 82° C., stirred and allowed to equilibrate. After an appropriate period the initial viscosities were measured and the pastes treated with 4.14% sodium hydroxide on starch dry solids and sodium trimetaphosphate (STMP) as described in the following table.

| AP (% As Is On Starch ds) Used in T/C Conversion Process | STMP % As Is On Starch ds | Viscosity* (cP**) at 82° C., 50 rpm 19.3% ds |
| --- | --- | --- |
| 0.05 | 0 | 439 |
| 0.05 | 0.13 | 11,100 |
| 0.05 | 0.26 | 29,100 |
| 0.05 | 0.52 | 50,700 |
| 0.10 | 0 | 167 |
| 0.10 | 0.13 | 298 |
| 0.10 | 0.26 | 2,620 |
| 0.10 | 0.52 | 48,300 |
| 0.15 | 0 | 98 |
| 0.15 | 0.13 | 138 |
| 0.15 | 0.26 | 150 |
| 0.15 | 0.52 | 250 |
| 0.20 | 0 | 50 |
| 0.20 | 0.13 | 48 |
| 0.20 | 0.26 | 57 |
| 0.20 | 0.52 | 59 |

*Brookfield Viscometer Model RVT
**1 cP = 0.001 N · s/m$^2$

The above results show that paste viscosities increase with increasing sodium trimetaphosphate usage and the paste viscosity of the starch phosphate is also dependent upon the ammonium persulfate use level.

EXAMPLE 3

An aqueous 24.5% dry solids starch slurry was prepared using unmodified corn starch. This slurry was then thermally-chemically converted using the following conditions.

Ammonium persulfate: As specified (% as is on starch dry solids basis).
Conversion temperature: 163° C.
Coil pressure: 5.64 kg/cm² gauge.
Retention time: 5 minutes.

The four resulting 20% dry solid pastes were cooled to 82° C. Sodium hydroxide at three percent on starch dry solids basis was added, followed by 0.03, 0.06, 0.13, 0.19 or 0.25% sodium trimetaphosphate (STMP) (on dry starch). A blank without any sodium trimetaphosphate was included for a control. The reacted pastes were then diluted to four percent dry starch for Brookfield viscosity determination. The results show the effect of ammonium persulfate on the final viscosity and are summarized below:

| STMP (% As Is On Starch ds) | Viscosity (cP) (100 RPM's, 82° C. 4% d.s.) At The Following AP Levels | | | |
|---|---|---|---|---|
| | 0.025% AP | 0.050% AP | 0.075% AP | 0.100% AP |
| None | 34 | 25 | 22 | 18 |
| 0.03 | 36 | 29 | 21 | 24 |
| 0.06 | 47 | 32 | 21 | 23 |
| 0.13 | 91 | 43 | 23 | 19 |
| 0.19 | 146 | 71 | 32 | 22 |
| 0.25 | 174 | 175 | 49 | 21 |

The results demonstrate the viscosity increase with sodium trimetaphosphate concentration and that the paste viscosity can be controlled with the addition of ammonium persulfate to the slurry before conversion.

EXAMPLE 4

Aqueous, 20% (dry solids) slurries of various thin-boiling, acid-modified starches were batch-cooked with agitation at 98° C. for 20 minutes using a straight-up cooking cycle. The resultant pastes were cooled to 82° C. in a water bath before treating with sodium hydroxide, 3-chloro-2-hydroxypropyltrimethylammonium chloride (CHPTA) and sodium trimetaphosphate (STMP)-sodium tripolyphosphate (STPP) mixtures as described in the following table. The reactions were allowed to proceed for 30 minutes before measuring the final viscosity (the initial paste viscosity and the viscosity after alkali addition were also measured).

lower the viscosity of the resultant cationic starch phosphate.

EXAMPLE 5

An aqueous, 25% (dry solids) slurry of unmodified starch was thermally-chemically converted using 0.15% ammonium persulfate (AP) (as, on starch ds) at 154° C. for about 5 minutes. The resultant paste was divided into portions, placed in a 82° C. water bath, stirred, and allowed to come to temperature. The pastes were then treated with sodium hydroxide and sodium trimetaphosphate as described in the following table. After a 30-minute reaction period, paste viscosities were measured and the reaction terminated by adjusting the paste pH to about 5 using dilute sodium hydroxide or hydrochloric acid as required. The resultant paste was then diluted to about 5% dry solids with hot tap water and dialyzed with hot tap water for about 24 hours. The dialyzed paste was recovered by freeze drying. The phosphorus content of the dry preparation was measured using the procedure of Smith and Caruso (Whistler, Green, BeMiller and Wolfrom, *Methods in Carbohydrate Chemistry*, Vol. IV [Academic Press, NY], 1963, pp. 42–46). The results were as follows:

| Reagents | | Paste | | | Phosphorus In Dry Product (% dsb) | Reaction Efficiency (%) |
|---|---|---|---|---|---|---|
| NaOH % On Starch ds | STMP % As Is On Starch ds | pH At End Of Reaction Period | Dry Solids (%) | Viscosity (cP) at 82° C. 50 rpm | | |
| 3.10 | 0 | 11.3 | 19.36 | 76 | 0.0120 | |
| 0 | 1.03 | 4.2 | 19.36 | 78 | 0.0136 | <1 |
| 1.03 | 1.03 | 10.4 | 19.36 | 125 | 0.0315 | 6 |
| 2.07 | 1.03 | 11.1 | 19.36 | 39800 | 0.0912 | 25 |
| 4.13 | 1.03 | 11.6 | 19.36 | 55700 | 0.1366 | 40 |
| 6.20 | 1.03 | 12.2 | 19.36 | — | 0.1709 | 51 |

The above results show that alkali is required to obtain efficient reaction of sodium trimetaphosphate with starch. The simple addition of sodium trimetaphosphate to a neutral to slightly acidic starch paste (i.e., no added alkali) resulted in no change in paste viscosity and a reaction efficiency of <1%. The reaction efficiency increased with increasing alkali usage. When no alkali was added to the starch-sodium trimetaphosphate mixture there was, for all practical purposes, no reaction, but a 51% reaction efficiency was noted when 6.2% sodium hydroxide was employed.

EXAMPLE 6

| Buel Fluidity of Starch | Initial Paste Viscostiy (cP) at 82° C., 50 rpm | NaOH % on Starch ds | Paste Viscosity After Alkaki Addition (cP) at 82° C., 50 rpm | CHPTA % On Starch ds | STMP % As Is On Starch ds | STPP % As Is On Starch ds | Paste Viscosity (cP) At End Of Reaction Period 82° C., 50 rpm |
|---|---|---|---|---|---|---|---|
| 25 | 31,500 | 4.0 | 2,750 | 5.0 | 0.016 | 0.027 | 46,900 |
| 35 | 6,730 | 4.0 | | 5.0 | 0.016 | 0.027 | 34,100 |
| 40 | 3,580 | 4.0 | 740 | 5.0 | 0.016 | 0.027 | 5,500 |
| 65 | — | 4.0 | — | 5.0 | 0.016 | 0.027 | 259 |

The above results show the preparation of amphoteric starches using sodium trimetaphosphate and 3-chloro-2-hydroxypropyltrimethylammonium chloride. As seen, paste viscosities were affected by the fluidity of the starch—i.e., the higher the fluidity of the starch, the An aqueous, 25% dry solids, slurry of unmodified corn starch was thermally-chemically converted using 154° C. for about 5 minutes and 0.2% ammonium persulfate (AP) (as is, on starch ds). The resultant paste was divided into portions and stored, with stirring, in water baths controlled at 49°, 60°, 71°, 82° and 93° C. After a suitable period of time, the pastes were treated with sodium hydroxide and sodium trimetaphosphate as described in the following table. Samples were removed after (1) 30 and (2) 120 minutes reaction, paste viscosities measured and the samples neutralized, diluted, dialyzed, freeze dried and assayed for phosphorus as described in Example 5. The results were as follows:

| Reaction | | Reagents | | Paste | | | |
|---|---|---|---|---|---|---|---|
| | | NaOH | STMP | | | | |
| Time (min.) | Temperature (°C.) | % On Starch ds | % As Is On Starch ds | Dry Solids (%) | Viscosity (cP) at 50 rpm & Indicated Temperature | Phosphorus In Dry Product (% dsb) | Reaction Efficiency (%) |
| 30 | 71 | 4.04 | 0 | 19.80 | 74 | 0.0130 | — |
| 30 | 49 | 4.04 | 1.01 | 19.80 | 2830 | 0.1687 | 51 |
| 30 | 60 | 4.15 | 1.04 | 19.26 | 6880 | — | — |
| 30 | 71 | 4.04 | 1.01 | 19.80 | 1520 | — | — |
| 30 | 82 | 4.15 | 1.04 | 19.26 | 133 | 0.1692 | 49 |
| 30 | 93 | 4.15 | 1.04 | 19.26 | 72 | 0.1721 | 50 |
| 120 | 71 | 4.04 | 0 | 19.80 | 77 | 0.0049 | — |
| 120 | 49 | 4.04 | 1.01 | 19.80 | 74800 | 0.1716 | 54 |
| 120 | 60 | 4.15 | 1.04 | 19.26 | 30320 | 0.2068 | 64 |
| 120 | 71 | 4.04 | 1.01 | 19.80 | 1050 | 0.1970 | 63 |
| 120 | 82 | 4.15 | 1.04 | 19.26 | 138 | 0.2037 | 63 |
| 120 | 93 | 4.15 | 1.04 | 19.26 | 117 | 0.1636 | 50 |

The above results show that the starch-sodium trimetaphosphate reaction is fairly rapid. After only 30 minutes reaction the efficiencies were about 50% and after 120 minutes the best efficiencies were in the 60–65% range.

EXAMPLE 7

An aqueous 24.5% dry solids starch slurry was prepared using unmodified corn starch. The slurry was then thermally-chemically converted using 0.12% ammonium persulfate (AP) (on dry starch) and the conditions as in Example 3. The resultant 17% dry solids paste was cooled to 82° C. Sodium hydroxide at 4.3% (on dry starch), 3-chloro-2-hydroxypropyltrimethylammonium chloride (CHPTA) at 6.9% (on dry starch) and sodium trimetaphosphate at 0.35% (on dry starch) were added to the hot starch paste. The reaction mixture was stirred and samples were removed at 1, 5, 10, 20 and 30-minute time intervals after the sodium trimetaphosphate was added. Immediately upon removal, the paste was precipitated and washed with an aqueous methanol solution. The wet cake was dried and phosphorus determined by atomic absorption. The data given in the following table demonstrate: (1) a gradual increase in bound phosphorus with time and (2) the starch-sodium trimetaphosphate reaction is substantially complete in 10 minutes.

| Minutes After STMP Added | % P On Starch ds | Reaction Efficiency (%) |
|---|---|---|
| 1 | 0.027 | 11 |
| 5 | 0.044 | 27 |
| 10 | 0.053 | 35 |
| 20 | 0.052 | 34 |
| 30 | 0.061 | 43 |

EXAMPLE 8

An aqueous 23% unmodified corn starch slurry was thermally-chemically converted using the following general conditions:

Ammonium persulfate (AP): 0.03%, as is, on starch ds
Conversion temperature: ~154° C.
Retention time: ~5 minutes.

Portions of the resultant paste were weighed into beakers equipped with agitators and then placed in an 82° C. water bath and allowed to come to temperature.

After a suitable period the pastes were treated with sodium carbonate and then sodium trimetaphosphate $(NaPO_3)_3$ as described in the following table.

| Reagents (% As Is On Starch ds) | | Paste ds (%) | Viscosity (cP) at 82° C., 50 rpm | Phosphorus In Dry Product % dsb | Reaction Efficiency (%) |
|---|---|---|---|---|---|
| $Na_2CO_3$ | STMP | | | | |
| 2.15 | 0 | 18.63 | 481 | 0.0048 | — |
| 2.15 | 5.07 | 18.63 | 61120 | 0.2882 | 18 |
| 2.15 | 10.13 | 18.63 | 44880 | 0.3975 | 13 |

After a 30-minute reaction period at 82° C., the viscosity of the paste was measured and the reaction was terminated by adjusting the pH to about 6 using dilute hydrochloric acid. The paste was then precipitated in methanol and the precipitated product washed twice with aqueous 75% methanol (by volume). The resultant washed product was dried and analyzed for phosphorus using the procedure given in Example 5.

The above results show a very significant increase in the paste viscosity of the sodium trimetaphosphate treated pastes. In addition, the results demonstrate that alkali other than NaOH can be employed.

EXAMPLE 9

An aqueous 24.5% dry starch slurry was thermally-chemically converted using unmodified corn starch with 0.08% ammonium persulfate (AP) (on dry starch) and the conditions set out in Example 3. The resultant 20% dry solids paste was divided into four portions and cooled to 82° C. Sodium hydroxide at four percent on starch dry solids basis was added, followed by either 0.22% ethyl acid phosphate, 0.36% dimethyl acid pyrophosphate, or 0.69% dioctyl acid pyrophosphate (on dry starch). A blank without any acid phosphates was also included. The reaction was allowed to proceed for 30 minutes at 82° C. under continuous stirring. The reacted pastes were then diluted and dialyzed for 40 hours. Finally, the samples were freeze dried and analyzed for phosphorus using atomic absorption procedures.

The results summarized in the following table demonstrate that organic phosphate can also be employed.

| Paste | Dry Solids (%) | Phosphorus Added, % On Starch ds | Phosphorus Detected After Dialysis % On Starch ds | Reaction Efficiency (%) | Viscosity 82° C. 100 rpm (cP) |
|---|---|---|---|---|---|
| Blank | 19.6 | None | None detected | — | 226 |
| Ethyl Acid Phosphate | 19.6 | 0.05 | None detected | 0 | 224 |
| Dimethyl Acid Pyrophosphate | 19.7 | 0.11 | 0.02 | 18 | 228 |
| Dioctyl Acid Pyrophosphate | 20.0 | 0.11 | 0.03 | 27 | 233 |

EXAMPLE 10

An aqueous, 25% dry solids, unmodified corn starch slurry was thermally-chemically converted using 0.08% ammonium persulfate (AP) (as is on starch ds) and the thermal-chemical conversion conditions listed in Example 6. The resultant paste was divided into portions, cooled to 82° C., and treated with sodium hydroxide, 3-chloro-2-hydroxypropyltrimethylammonium chloride and sodium trimetaphosphate as described in the following table. After a 30-minute reaction period, paste viscosities were measured before terminating the reaction by adjusting the paste pH to 5–6 using dilute hydrochloric acid. The samples were diluted to 5% dry solids, dialyzed, freeze dried and analyzed for phosphorus as described in Example 5. The nitrogen content of the dry product, measured using the Kjeldahl procedure, was employed to calculate the degree of substitution (DS) and the cationization reaction efficiency.

curred simultaneously to produce an amphoteric starch paste.

EXAMPLE 11

An aqueous, 25% dry solids, slurry of unmodified corn starch was thermally-chemically converted using the conditions described in Example 6 and 0.08–0.12% ammonium persulfate. The resultant pastes were divided into portions and brought to temperature in an 82° C. water bath. The pastes were then treated with sodium hydroxide, 3-chloro-2-hydroxypropyltrimethylammonium chloride and sodium trimetaphosphate as described in the following table and allowed to react for 30 minutes. At the end of the reaction period, paste viscosities were measured and the samples dialyzed and dried using procedures similar to those described in Example 5. The cationization degree of substitution (DS) and phosphorus content were calculated using the procedures described in Examples 10 and 5, respectively.

Results, summarized in the following table, show that thinned, cationic starch phosphates can be prepared using various combinations of ammonium persulfate, 3-chloro-2-hydroxypropyltrimethylammonium chloride and sodium trimetaphosphate.

| Reagents | | | | Paste | | Cationization Reaction | | Phosphorylation Reaction | |
|---|---|---|---|---|---|---|---|---|---|
| AP % As Is On Starch ds | NaOH % On Starch ds | CHPTA % On Starch ds | STMP % As Is On Starch ds | Dry Solids (%) | Viscosity (cP) at 82° C. 50 rpm | DS | Reaction Efficiency (%) | P In Dry Product % dsb | Reaction Efficiency (%) |
| 0.08 | 4.22 | 0 | 0 | 18.97 | 176 | 0 | — | 0.0063 | — |
| 0.08 | 4.22 | 5.27 | 0.198 | 18.97 | 5,240 | 0.0327 | 72 | 0.0308 | 41 |
| 0.10 | 5.27 | 6.59 | 0.251 | 18.97 | 3,450 | 0.0384 | 68 | 0.0523 | 61 |
| 0.10 | 5.49 | 8.24 | 0.309 | 18.20 | 1,520 | 0.0480 | 68 | 0.0587 | 56 |
| 0.12 | 5.27 | 7.91 | 0.297 | 18.97 | 377 | — | — | 0.0587 | — |

EXAMPLE 12

A 24.5% aqueous starch slurry was prepared using unmodified corn starch and then thermally-chemically converted under the conditions described in Example 3, with 0.081, 0.098, 0.108 or 0.118% ammonium persulfate added to the slurry. The four resulting 20% dry solids pastes were cooled to 82° C. Sodium hydroxide at four percent on starch dry solids basis was added, followed by 3-chloro-2-hydroxypropyltrimethylammonium chloride (CHPTA) and sodium trimetaphosphate (STMP) as described in the following table. The reaction conditions for each sample were the same as in Example 9. The unreacted cationic reagent was removed by precipitating the paste in and washing with methanol. The resulting cake was dried for Kjeldahl nitrogen determination. The unreacted anionic reagent

| Reagents | | | Paste | | Reaction Efficiency | | | |
|---|---|---|---|---|---|---|---|---|
| NaOH % On Starch ds | CHPTA % On Starch ds | STMP % As Is On Starch ds | Dry Solids (%) | Viscosity (cP) at 82° C. 50 rpm | CHPTA | | STMP Phosphorus | |
| | | | | | DS | Reaction Efficiency (%) | In Dry Product (% dsb) | Reaction Efficiency (%) |
| 4.10 | 0 | 0 | 19.51 | 241 | — | — | 0.0032 | — |
| 4.10 | 5.13 | 0 | 19.51 | 229 | 0.0301 | 68 | 0.0062 | — |
| 4.10 | 5.13 | 0.096 | 19.51 | 388 | 0.0301 | 68 | 0.0227 | 57 |
| 4.10 | 5.13 | 0.192 | 19.51 | 3430 | 0.0305 | 69 | 0.0443 | 65 |
| 4.10 | 5.13 | 0.295 | 19.51 | 44000 | 0.0298 | 68 | — | — |

The above results show that both the etherification reaction of 3-chloro-2-hydroxypropyltrimethylammonium chloride and the etherification reaction of sodium trimetaphosphate reacted with the starch ocwas removed by dialysis and the product recovered by freeze drying. The phosphorus content of the dry products was determined by atomic absorption procedures. The results were as follows:

| AP (% As Is On Starch ds) | CHPTA (% On Starch ds) | D.S.* Of Cationic Derivative | Reaction Efficiency (%) | STMP (% On Starch ds) | Phosphorus (% On Starch ds) | Reaction Efficiency (%) | Viscosity (cP) 100 rpm 57° C. |
|---|---|---|---|---|---|---|---|
| 0.081 | 5.0 | 0.034 | 79 | 0.19 | 0.047 | 64 | ** |
| 0.081 | 5.5 | 0.036 | 76 | 0.21 | 0.040 | 47 | ** |
| 0.081 | 6.0 | 0.040 | 77 | 0.23 | 0.049 | 56 | ** |
| 0.098 | 5.0 | 0.033 | 77 | 0.24 | 0.069 | 87 | 8,900 |
| 0.098 | 5.5 | 0.036 | 76 | 0.26 | 0.076 | 88 | 9,400 |
| 0.108 | 6.0 | 0.038 | 73 | 0.28 | 0.061 | 61 | 9,200 |
| 0.108 | 5.0 | 0.033 | 77 | 0.28 | 0.061 | 61 | 7,600 |
| 0.118 | 5.5 | 0.035 | 74 | 0.31 | 0.063 | 57 | 4,000 |
| 0.118 | 6.0 | 0.038 | 73 | 0.34 | 0.068 | 58 | 10,000 |

*Degree of Substitution corrected for parent nitrogen.
**Not tested.

The cationic reaction efficiencies were approximately 75% with the anionic reaction efficiencies averaging in the 50–60% range. The results demonstrate a simultaneous reaction of an amphoteric paste with excellent reaction efficiencies at very short reaction time.

EXAMPLE 13

A starch slurry was thermally-chemically converted using 0.08% ammonium persulfate, dry solids basis, and the conditions described in Example 3. The resultant paste was divided into four portions and cooled to 82° C. Sodium hydroxide at four percent on starch dry solids basis was added, followed by (1) 0.64% sodium tripolyphosphate (STPP), (2) 0.77% sodium pyrophosphate (SPP) or (3) 1.06% sodium hexametaphosphate (SHMP) (on dry starch). A blank without any added inorganic phosphates was also included. The reaction, dialysis and drying conditions were the same as in Example 9. The results are illustrated in the following table. Phosphorus contents were measured using atomic absorption procedures.

| Sample | Dry Solids (%) | Phosphorus Added, % On Starch ds | Phosphorus Detected After Dialysis % On Starch ds | Reaction Efficiency (%) | Viscosity 82° C. 100 rpm (cP) |
|---|---|---|---|---|---|
| Blank | 19.6 | None | 0.02 | — | 203 |
| STPP | 20.0 | 0.16 | 0.10 | 50 | 217 |
| SPP | 20.0 | 0.11 | 0.08 | 55 | 215 |
| SHMP | 20.1 | 0.32 | 0.20 | 56 | 273 |

The above results demonstrate that a significant amount of phosphorus was bound to the starch. The paste viscosities indicate no crosslinking, consequently the formation of mono-starch phosphates.

EXAMPLE 14

An aqueous 24.5% dry solids starch slurry was prepared using unmodified corn starch. The slurry was then thermally-chemically converted with 0.12% ammonium persulfate (on dry starch) using conditions as described in Example 3. The resultant 20% paste was divided into three portions, cooled to 82° C., and treated with sodium hydroxide, 3-chloro-2-hydroxypropyltrimethylammonium chloride (CHPTA) and sodium tetrametaphosphate (STMP) as described in the following table. The reaction conditions were the same as in Example 9. At the end of the reaction period the samples were diluted 1:1 with cold water and precipitated and washed with an aqueous methanol solution. The unbound cationic and anionic reagents were removed in the filtrate. The wet cakes were dried for nitrogen and phosphorus analysis using procedures described in Examples 10 and 7, respectively.

The results summarized in the following table indicate that satisfactory efficiencies were obtained for both the cationization and phosphorylization reactions conducted simultaneously.

| | Cationic CHPTA) | | | Anionic (STMP) | | |
|---|---|---|---|---|---|---|
| Sample Type | Mol Ratio Added | D.S. Determined | Reaction Efficiency (%) | P Added (% On Starch ds) | P Determined (% On Starch ds) | Reaction Efficiency (%) |
| Cationic | 0.05 | 0.034 | 68 | 0.0 | <0.015 | — |
| Anionic | 0.0 | 0.0 | — | 0.091 | 0.105 | 99 |
| Amphoteric | 0.05 | 0.032 | 64 | 0.091 | 0.084 | 79 |

As seen from the foregoing, by means of the present invention starch phosphate derivatives can be prepared in short periods with good efficiency of reaction. Moreover, amphoteric starch phosphates can be prepared quickly with excellent reaction efficiency obtained for both the anionization and cationization reactions.

Those modifications and equivalents which fall within the spirit of the invention are to be considered a part thereof.

What is claimed is:

1. A process for preparing a starch derivative which comprises:
   (1) treating an aqueous thinned starch paste with an alkali or alkaline material to give an alkaline pH,
   (2) reacting with the alkaline starch paste while maintaining an alkaline pH a phosphate salt at a temperature of about 45° to 95° C. for a period of not more than about 120 minutes, and
   (3) recovering a starch phosphate paste.

2. A process in accordance with claim 1 wherein the phosphate salt is a metaphosphate.

3. A process in accordance with claim 1 wherein the phosphate salt is sodium trimetaphosphate.

4. A process in accordance with claim 1 wherein the phosphate is sodium hexametaphosphate.

5. A process in accordance with claim 1 wherein the phosphate is a pyrophosphate.

6. A process for preparing a starch derivative which comprises:
   (1) preparing an aqueous starch slurry wherein the starch is present in a concentration of 3% to 40% by weight,
   (2) heating the starch slurry to paste the starch,
   (3) thinning the starch paste,
   (4) treating the resultant starch paste with an alkali or an alkaline material to give an alkaline pH,
   (5) reacting at a temperature of about 45° to 95° C. with the alkaline starch paste while maintaining an alkaline pH a phosphate salt for a period of not more than about 120 minutes, and
   (6) recovering a starch phosphate paste.

7. A process in accordance with claim 6 wherein the phosphate salt is a metaphosphate.

8. A process in accordance with claim 6 wherein the phosphate salt is sodium trimetaphosphate.

9. A process in accordance with claim 6 wherein the phosphate salt is sodium hexametaphosphate.

10. A process in accordance with claim 6 wherein the phosphate salt is a pyrophosphate.

11. A process in accordance with claim 6 wherein a water-soluble oxidizing agent is incorporated into the starch slurry.

12. A process for preparing a starch phosphate which comprises:
    (1) preparing an aqueous starch slurry wherein the starch is present in a concentration of 3% to 40% by weight,
    (2) incorporating with the starch slurry a water-soluble oxidizing agent, an alkali or alkaline material to give an alkaline pH and a phosphate salt,
    (3) heating said treated slurry for a period of not more than about 120 minutes to paste the starch and substantially simultaneously react the alkaline starch paste while maintaining an alkaline pH with the phosphate salt, and
    (4) recovering a starch phosphate paste.

13. A process in accordance with claim 12 wherein the phosphate salt is a metaphosphate.

14. A process in accordance with claim 12 wherein the phosphate salt is sodium trimetaphosphate.

15. A process in accordance with claim 12 wherein the phosphate salt is sodium hexametaphosphate.

16. A process in accordance with claim 12 wherein the phosphate salt is a pyrophosphate.

17. A process for preparing a starch derivative which comprises:
    (1) treating an aqueous thinned starch paste with an alkali or alkaline material to give an alkaline pH,
    (2) reacting with the alkaline starch paste while maintaining an alkaline pH a phosphate salt and a cationizing agent at a temperature of about 45° to 95° C. for a period of not more than about 120 minutes, and
    (3) recovering a cationic starch phosphate paste.

18. A process in accordance with claim 17 wherein the reactions of the starch paste with the phosphate salt and a cationizing agent are conducted simultaneously.

19. A process in accordance with claim 17 wherein the reactions of the starch paste with the phosphate salt and a cationizing agent are conducted sequentially.

20. A process for preparing a starch derivative which comprises:
    (1) preparing an aqueous starch slurry wherein the starch is present in a concentration of 3% to 40% by weight,
    (2) heating the starch slurry to paste the starch,
    (3) thinning the starch paste,
    (4) treating the resultant starch paste with alkali or an alkaline material to give an alkaline pH,
    (5) reacting at a temperature of about 45° C. to 95° C. with the alkaline starch paste while maintaining an alkaline pH for a period of not more than about 120 minutes a phosphate and a cationizing agent, and
    (6) recovering a cationic starch phosphate paste.

21. A process in accordance with claim 20 wherein the reactions of step 4 are conducted simultaneously.

22. A process in accordance with claim 20 wherein the reactions of step 4 are conducted sequentially.

23. A process in accordance with claim 20 wherein the cationizing agent is a monomeric halogenated alkyl or alkenyl amine.

24. A process in accordance with claim 20 wherein 3-chloro-2-hydroxypropyltrimethylammonium chloride is employed as a cationizing agent.

25. A process in accordance with claim 20 wherein 2-diethylaminoethyl chloride hydrochloride is employed as a cationizing agent.

26. A process in accordance with claim 20 wherein 4-chloro-2-butenyltrimethylammonium chloride is employed as a cationizing agent.

27. A process in accordance with claim 20 wherein a water-soluble oxidizing agent is incorporated into the starch slurry as a thinning agent.

28. A process in accordance with claim 20 wherein the phosphate salt is a metaphosphate.

29. A process in accordance with claim 20 wherein the phosphate salt is sodium trimetaphosphate.

30. A process in accordance with claim 20 wherein the phosphate salt is sodium hexametaphosphate.

31. A process in accordance with claim 20 wherein the phosphate salt is a pyrophosphate.

32. A process for preparing a cationic starch phosphate which comprises:
    (1) preparing an aqueous starch slurry wherein the starch is present in a concentration of 3% to 40% by weight,
    (2) incorporating with the starch slurry a water-soluble oxidizing agent, an alkali or alkaline material to give an alkaline pH, a phosphate salt and a cationizing agent,
    (3) heating said treated slurry for a period of not more than about 120 minutes to paste the starch and substantially simultaneously react the alkaline starch paste while maintaining an alkaline pH with the phosphate salt and cationizing agent, and
    (4) recovering a cationic starch phosphate paste.

* * * * *